(12) United States Patent
Näslund et al.

(10) Patent No.: US 8,539,564 B2
(45) Date of Patent: Sep. 17, 2013

(54) IP MULTIMEDIA SECURITY

(75) Inventors: Mats Näslund, Bromma (SE); Rolf Blom, Järfälla (SE); Yi Cheng, Sundbyberg (SE); Fredrik Lindholm, Stockholm (SE); Karl Norrman, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 4 days.

(21) Appl. No.: 13/254,013

(22) PCT Filed: Mar. 4, 2009

(86) PCT No.: PCT/EP2009/052560
§ 371 (c)(1),
(2), (4) Date: Oct. 7, 2011

(87) PCT Pub. No.: WO2010/099823
PCT Pub. Date: Sep. 10, 2010

(65) Prior Publication Data
US 2012/0198527 A1    Aug. 2, 2012

(51) Int. Cl.
*G06F 7/04* (2006.01)
(52) U.S. Cl.
USPC .............................................. 726/6; 380/277
(58) Field of Classification Search
USPC .................... 726/3, 6, 15; 380/277; 713/171
See application file for complete search history.

(56) References Cited

U.S. PATENT DOCUMENTS

2006/0288423 A1* 12/2006 Le et al. ........................ 726/26
2009/0220091 A1* 9/2009 Howard ....................... 380/277

FOREIGN PATENT DOCUMENTS

WO    2006/134505 A1    12/2006
WO    2007/023286 A1    3/2007

OTHER PUBLICATIONS

3rd Generation Partnership Project. 3GPP TR 33.828, V1.0.0. 3rd Generation Partnership Project; Technical Specification Group Services and System Aspects; IMS media plane security (Release 8). Mar. 2009.

* cited by examiner

*Primary Examiner* — Samson Lemma
(74) *Attorney, Agent, or Firm* — Coats & Bennett, P.L.L.C.

(57) ABSTRACT

A method of establishing keys for at least partially securing media plane data exchanged between first and second end users via respective first and second media plane network nodes. The method comprises sending session set-up signalling from said first end point towards said second end point, said session set-up signalling including a session key generated by said first end point. The set-up signalling is intercepted at a first signalling plane network node and a determination made as to whether or not a signalling plane key has already been established for securing the signalling plane between said first end point and said first signalling plane network node. If a signalling plane key has already been established, then a media plane key is derived from that signalling plane key, and the media plane key sent to said first media plane network node for securing the media plane between said first end user and said first media plane network node. If a signalling plane key has not already been established, then an alternative media plane key is derived from said session key and sent to said first media plane network node for securing the media plane between said first end user and said first media plane network node.

22 Claims, 5 Drawing Sheets

IP MULTIMEDIA SECURITY

TECHNICAL FIELD

The invention relates to IP Multimedia security and in particular to a method and apparatus for securing IP Multimedia user traffic in the access networks.

BACKGROUND

Internet Protocol (IP) Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packet switched transmissions well beyond the 64 kbps limit of ISDN through the GSM call network, which is a necessity for UMTS data transmission rates of up to 2 Mbps. UMTS is standardised by the 3rd Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The so-called Long Term Evolution (LTE) is being developed as a successor to UMTS by 3GPP. It is hoped that LTE will increase data rates greatly, for example to 100 Mbps.

The 3G (UMTS/LTE) architectures includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 9). Security functions for IMS are specified mainly in TS 33.203, but also in TS 33.178. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Whilst IMS has been established with UMTS/LTE access in mind, i.e. where users access the IMS services via UMTS cellular networks, IMS is intended to be used with a variety of access network technologies including technologies defined outside 3GPP. As such, a user can connect to an IMS network in a number of different ways, all of which use the Internet Protocol (IP). Terminals implementing IMS clients (such as mobile phones, personal digital assistants, computers, and Home IMS Gateways) can register directly on an IMS network, even when they are roaming in another network. The only requirement is that they can use IPv4/IPv6 and run Session Initiation Protocol (SIP) user agents. Fixed access (e.g., Digital Subscriber Line (DSL), cable modems, PON, Ethernet), mobile access (e.g. CDMA2000, GSM, GPRS, LTE) and wireless access (e.g. WLAN, WiMAX) are all supported. Other phone systems like plain old telephone service (POTS), H.323 and non IMS-compatible Voice over IP (VoIP) systems, may be supported through gateways.

Considering security, IMS provides security for SIP signalling (subscriber authentication and SIP message integrity) built on ISIM based AKA and IPSec as specified in TS 33.203. The 3GPP organisation is currently conducting a study to define a solution for IMS media security, see TR 33.828. Although there is currently no 3GPP standard to secure media/user plane traffic (e.g. the VoIP traffic itself which is typically carried by Real-Time Transport Protocol (RTP)), in the case where an IMS user uses a mobile access network (e.g. 3GPP WCDMA or LTE), it can be assumed that IMS traffic sent across the access network is reasonably well secured by the underlying access network security (e.g. the air interface security of WCDMA). However, this is not the case where the access network is a public access network such as a WLAN or DSL network. The security of user authentication procedures may also vary greatly between different access network types. For example, as discussed, strong ISIM based authentication may be used in 3GPP access networks, but with only weak, password based (digest) authentication or even "bundled" authentication (relying on Layer 2 authentication, TS 33.178) being used in other access network types.

In order to provide security for IMS users with minimum impact on user terminals, it is proposed to implement an edge-to-access-edge (e2ae) media plane encryption solution. This is illustrated in FIG. 1 where an IMS session between two IMS users A and B is secured by encryption between A and a first edge node EA (via an access router AR) and between B and a second edge node EB (via a cellular network comprising a Base Station Transceiver BST). It is assumed that the media plane between EA and EB is secure as a result of the private nature of the operator network(s). Such an e2ae solution is typically preferred over an end-to-end (e2e) solution, as an e2e solution would require some agreement between user terminals (and possibly access networks) as to key negotiation mechanisms and would therefore be difficult, or even impossible, to implement in practice since A and B and/or their respective networks may not have interoperable security solutions. A further advantage of the e2ae approach is that an operator may easily perform transcoding, rate adaptation, and/or lawful intercept on session data, as the data is transported across its network without encryption (or at least in a form that can be decrypted by the operator).

The e2ae solution is often also preferred over an edge-to-middle (e2m) approach, in which user terminals establish a secure connection to a common "middle-box" M, as such a solution requires that both ends have access to such a middle-box and are able to communicate with it.

One possible e2ae solution is to employ the IETF protocol known as Session Description Protocol Security Descriptions for Media Streams (SDES), IETF RFC 4568.

In this approach, the end users (A and B) randomly select respective keys, KA and KB, and include them in the SIP call set-up signalling (e.g. INVITE, 200 OK). Rather than using the keys to establish e2e media plane security (with at least some of the ensuing disadvantages outlined above), certain Call Session Control Functions (CSCFs) within the IMS "snoop", i.e. intercept and extract, these keys in the SIP messages and distribute them to the respective edge-entities. Each edge-entity uses the snooped key to secure data exchanged between it and the attached end user (that is entity EA uses key KA to secure data with user A, and entity EB uses key KB to secure data with user B). Note that in practice it may be desirable to use different keys when securing traffic originating at A (traffic from A to EA) and when securing traffic terminating at A (traffic forwarded by EA to A). However, as long as A and EA have at least one shared key, KA, it will be easy for them to derive two (or more) keys from KA by application of a cryptographic key derivation function. The same holds for B and EB of course. SDES is a candidate solution which is considered in the ongoing 3GPP study. While this approach is generic, it has a major drawback in that the SIP signalling itself may not be encrypted and hence the keys KA/KB are available in the clear to any third party as well. Therefore this solution may utterly fail to provide security.

SUMMARY

It is an object of the invention to provide IP multimedia security by determining, within an IP multimedia network, whether or not a relatively strong security mechanism is available and, where it is, to use that mechanism to secure the user media plane.

According to a first aspect of the invention there is provided a method of establishing keys for at least partially securing media plane data exchanged between first and second end users via respective first and second media plane network nodes. The method comprises sending session set-up signalling from said first end point towards said second end point, said session set-up signalling including a session key generated by said first end point. The set-up signalling is intercepted at a first signalling plane network node and a determination made as to whether or not a signalling plane key has already been established for securing the signalling plane between said first end point and said first signalling plane network node. If a signalling plane key has already been established, then a media plane key is derived from that signalling plane key, and the media plane key sent to said first media plane network node for securing the media plane between said first end user and said first media plane network node. If a signalling plane key has not already been established, then an alternative media plane key is derived from said session key and sent to said first media plane network node for securing the media plane between said first end user and said first media plane network node. An example of said set-up signalling is a SIP INVITE message.

The first signalling plane network node may be a node within an IP Multimedia Subsystem network, in which case said signalling plane network node may be a Proxy Call State Control Function. The of determining whether or not a signalling plane key has already been established for securing the signalling plane between said first end point and said first signalling plane network node, may comprise determining whether or not an IP Multimedia Subsystem network AKA procedure has been run between said first end point and the IP Multimedia Subsystem network.

Said session set-up signalling may contain an explicit indication of whether or not a signalling plane key has already been established.

In the case where a signalling plane key has already been established, said media key may be derived using both said signalling plane key and said session key.

In an embodiment of the invention, said session key may be generated and transferred by said first end point in accordance with the Session Description Protocol Security Descriptions for Media Streams (SDES) protocol.

The method may comprise the steps of:
intercepting session set-up signalling at a second signalling plane network node and determining whether or not a signalling plane key has already been established for securing the signalling plane between said second end point and said second signalling plane network node; and if a signalling plane key has already been established, then deriving from that key a media plane key, and sending the media plane key to said second media plane network node for securing the media plane between said second end user and said second media plane network node.

In this case, said second signalling plane network node may be a node within an IP Multimedia Subsystem network. Said step of determining whether or not a signalling plane key has already been established for securing the signalling plane between said second end point and said second signalling plane network node, may comprise determining whether or not an IP Multimedia Subsystem network AKA procedure has been run between said second end point and the IP Multimedia Subsystem network. Said session set-up signalling intercepted at said second signalling plane network node may include a session key generated by said second end point, the method comprising, in the event that a signalling plane key has not already been established, then deriving from said session key an alternative media plane key, and sending that alternative media plane key to said second media plane network node for securing the media plane between said second end user and said second media plane network node. Alternatively, said session set-up signalling intercepted at said second signalling plane network node may include said session key generated by said first end point, the method comprising, in the event that a signalling plane key has not already been established, then deriving from said session key an alternative media plane key, and sending that alternative media plane key to said second media plane network node for securing the media plane between said second end user and said second media plane network node.

According to a second aspect of the invention there is provided a user terminal for conducting a media session with a peer user terminal. The apparatus a session key generator for generating a session key, and a session initiator for sending session set-up signalling towards said peer user terminal, via a first signalling plane network node, the session initiator including in said signalling, said session key. There is also provided a media key generator for determining whether or not a signalling plane key has already been established for securing the signalling plane between the user terminal and said first signalling plane network node, and, if a signalling plane key has already been established, for then deriving from that signalling plane key a first media plane key, and, if a signalling plane key has not already been established, for then deriving from said session key a second media plane key. A session manager is further provided for using the first or second media plane key to secure the media plane between the user terminal and said first media plane network node. Said session initiator may comprise an IP Multimedia Subsystem client.

Said media key generator may determine whether or not a signalling plane key has already been established by determining whether or not an IP Multimedia Subsystem AKA procedure has been run between the user terminal and an IP Multimedia Subsystem network.

Said session key generator and said session initiator may be configured according to implement the Session Description Protocol Security Descriptions for Media Streams protocol.

According to a third aspect of the invention there is provided a signalling plane network node comprising a receiver for intercepting session set-up signalling sent from a first end point towards a second end point, and an analyzer for determining whether or not a signalling plane key has already been established for securing the signalling plane between said first end point and the signalling plane network node. There is further provided a media plane key generator and distributor configured, in the event that a signalling plane key has already been established, to derive from that key a media plane key, and, in the event that a signalling plane key has not already been established, to derive from a session key included in said set-up signalling, an alternative media plane key. The media plane key generator and distributor is further configured to send the media plane key or alternative media plane key to said first media plane network node for securing the media plane between said first end point and said first media plane network node.

The node may be an IP Multimedia Subsystem network server, for example a Proxy Call State Control Function.

According to a fourth aspect of the invention there is provided a computer program for causing a user terminal to perform the following steps:
1. generating a session key;
2. sending session set-up signalling towards a peer user terminal, via a first signalling plane network node, and including in said signalling, said session key;
3. determining whether or not a signalling plane key has already been established for securing the signalling plane between the user terminal and said first signalling plane network node, and, if a signalling plane key has already been established, for then deriving from that signalling plane key a first media plane key, and, if a signalling plane key has not already been established, for then deriving from said session key a second media plane key; and
4. using the first or second media plane key to secure the media plane between the user terminal and said first media plane network node.

According to a fifth aspect of the invention there is provided computer program product including a computer useable medium having stored thereon a computer program according to the above fourth aspect of the invention.

According to a sixth aspect of the invention there is provided computer program for causing a network node to perform the following steps:
1. intercepting session set-up signalling sent from a first end point towards a second end point;
2. determining whether or not a signalling plane key has already been established for securing the signalling plane between said first end point and the signalling plane network node;
3. in the event that a signalling plane key has already been established, to derive from that key a media plane key, and, in the event that a signalling plane key has not already been established, to derive from a session key included in said set-up signalling, an alternative media plane key; and 4. sending the media plane key or alternative media plane key to said first media plane network node for securing the media plane between said first end point and said first media plane network node.

According to a seventh aspect of the invention there is provided computer program product including a computer useable medium having stored thereon a computer program according to the above sixth aspect of the invention.

DETAILED DESCRIPTION

Where a user terminal or user equipment (UE) attaches to an IP Multimedia Subsystem (IMS) network via a UMTS (or LTE) access network, the IMS AKA mechanism will most likely be used to authenticate the subscriber and to secure traffic in the signalling plane. AKA results in the creation and sharing of a pair of keys (Ck, Ik) between the UE and a P-CSCF. These keys can also be used as a basis for protecting user data in the media plane, e.g. by deriving a key K_media=hash(Ck, Ik, . . . ) and providing this key from the P-CSCF to an edge entity. This edge entity may be a Media Resource Function (MRF), or a gateway such as a SGSN, SAE or PDN gateway. Of course, when a user terminal accesses the IMS via some other access technology, the AKA related keys are not present and an alternative security mechanism is required. On the other hand, a Session Description Protocol Security Descriptions for Media Streams (SDES) based approach has the advantage that it is independent of the user authentication mechanisms that are being used (if any). A terminal using the SDES protocol will always include an SDES-encoded key, KA, in a SIP call set-up message.

It is proposed here to detect within the IMS, e.g. at the P-CSCF, whether or not a user terminal has previously been authenticated using IMS AKA. If so, then the media plane is secured based upon the shared AKA keys. If not, the IMS falls back to an SDES-based e2ae approach. Considering this mechanism from the point of view of a P-CSCF, the following high level steps can be defined:

1. Receive a SIP call set-up message from a UE (in this case UE A).
2. "Snoop", i.e. capture and inspect, the SIP message to identify the SDES key, KA.
3. Check if the UE A has previously authenticated using AKA (during IMS registration), thereby creating keys (Ck, Ik).
4. If so, derive media key K_media=hash(Ck, Ik, . . . ) else derive media key K_media=hash(KA, . . . ). [Alternatively, the P-CSCF may include the key KA in the key derivation step, e.g. K_media=hash(KA, Ck, Ik, . . . ).]
5. Distribute K_media to the edge entity.

It will be understood that the UE must be aware of if (and how) it has previously been authenticated towards the IMS. The UE will perform the equivalent processing so as to derive the same key K_media.

Figure 1:
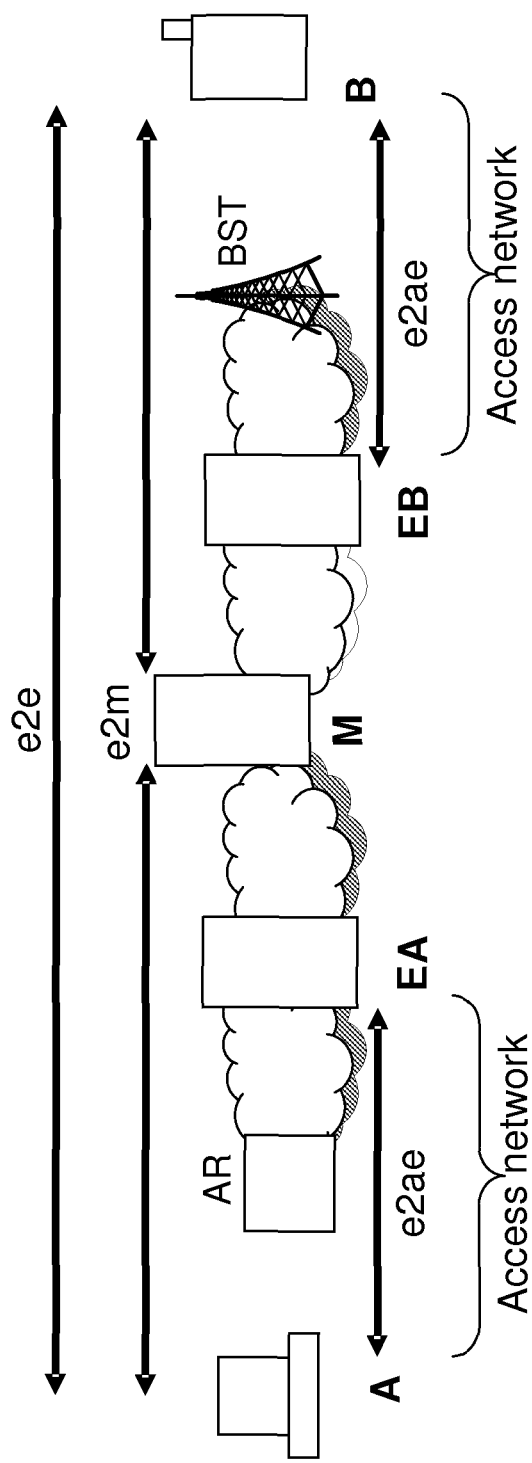
FIG. 1 illustrates various approaches to securing the media plane between two user terminals engaged in an IMS enabled session.
Figure 2:
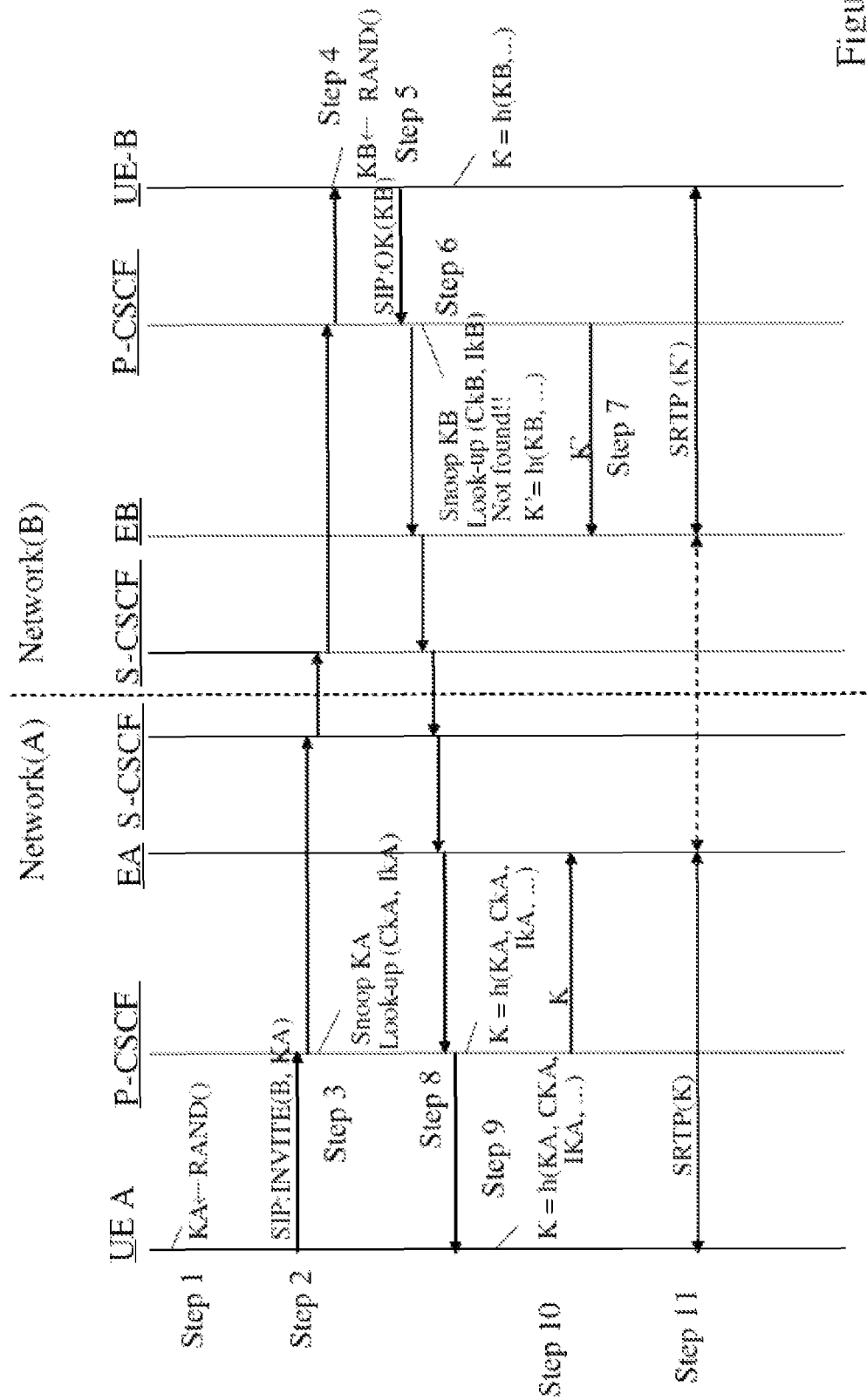
FIG. 2 illustrates signalling associated with an e2ae approach to securing the media plane.

FIG. 2 illustrates the proposed procedure in more detail, taking as an example a scenario in which a user A has been authenticated using IMS AKA, but a peer user, user B, has not. Certain SIP messages which are not directly relevant to the proposed mechanism are not shown for the sake of simplicity. The procedure involves the following steps:

1. UE A, wishing to initiate an IMS call to user B, chooses a random SDES key, KA.
2. UE A sends the SIP INVITE which includes (among other things) the identity of user B and the key KA.
3. The P-CSCF of A snoops the message and extracts the key KA. The P-CSCF also checks if A has been previously authenticated using IMS AKA. In this example, this is the case. The INVITE is forwarded towards B's network. The P-CSCF of user A may or may not remove KA before forwarding the INVITE towards UE B.
4. UE B receives the INVITE via user B's P-CSCF (if included, the P-CSCF may or may not remove KA from the INVITE).
5. UE B generates an SDES key, KB, and includes it when accepting the INVITE, sending a SIP OK including KB to its P-CSCF.
6. The P-CSCF of user B snoops the key KB and checks if B has been previously authenticated using IMS AKA. In this example, this is not the case. The P-CSCF of B therefore creates a media key K' in dependence on the key KB (only). The SIP OK response is also forwarded back towards user A's network, with or without KB.
7. The P-CSCF of user B prepares for a secure media session by sending K' to EB.
8. The SIP response accepting the call is received by user A's P-CSCF, which now derives the media protection key K from KA, CkA and IkA.
9. The SIP response is forwarded back to UE A (with or without KB if included in the response forwarded by user B's P-CSCF) and the key K is sent to EA.
10. UE A receives the call acceptance and derives the same key K.
11. A secure media session is established between UE A and UE B, via EA and EB, using e.g. the Secure Realtime Transport Protocol (SRTP), RFC3711.

It will be clear that, in the above embodiment, the setup signalling between a UE and its associated P-CSCF will always "look" the same, regardless of whether or not any IMS AKA process has been run, and only the local processing in UE/P-CSCF differs.

In the exemplary embodiment above, it is assumed that both P-CSCFs implements the security process as they both perform an authentication check of their respective users. Of course, this is not necessary. For example, the P-CSCF of B could be a legacy P-CSCF unable to perform the authentication check of step 6. In this case, P-CSCF B may create the media key in dependence on KB. This further demonstrates the attractive property of e2ae security, namely that each end of the connection may use different approaches to media security without interoperability problems.

Figure 3:
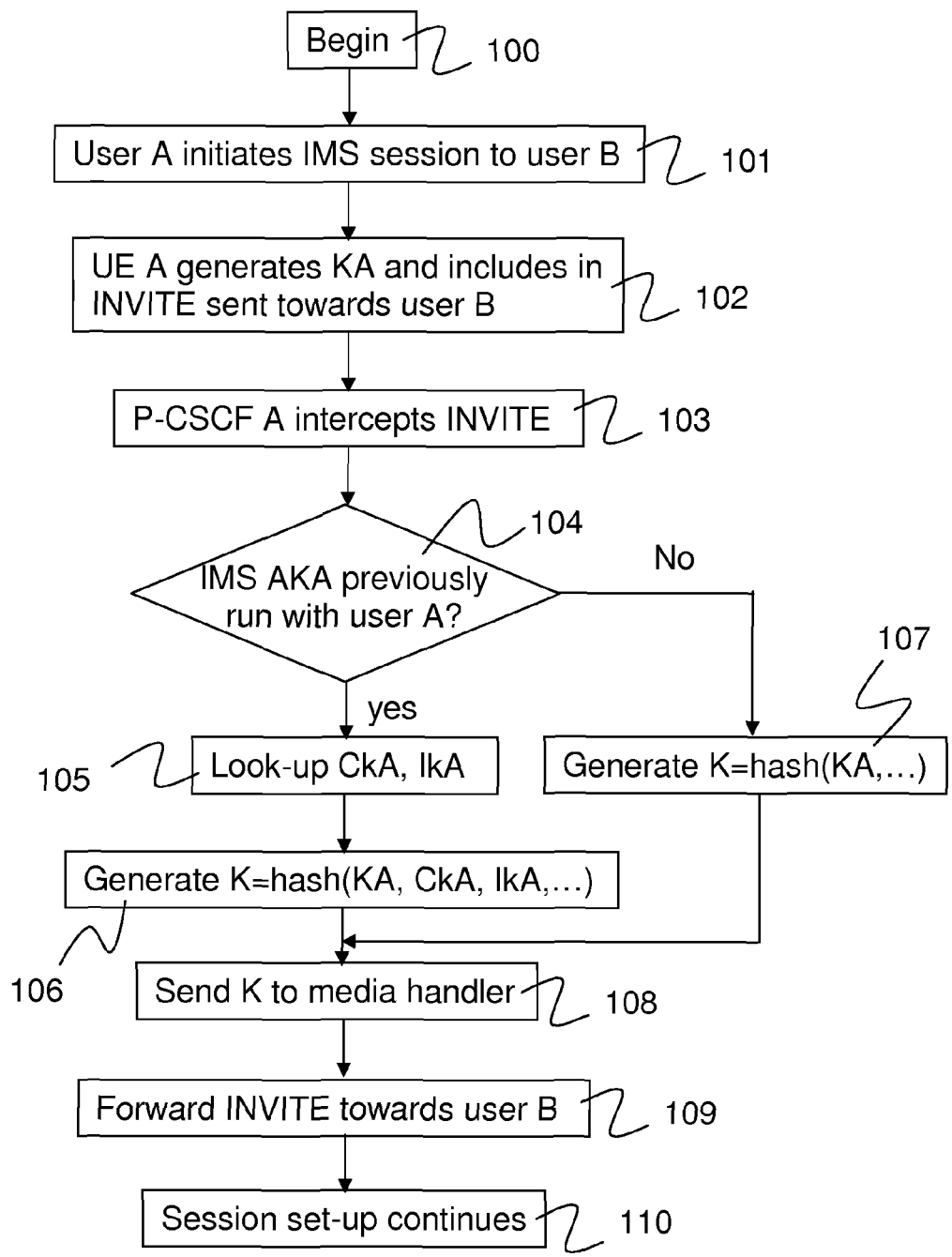
FIG. 3 is a flow diagram further illustrating the approach of FIG. 2.

FIG. 3 is a flow chart illustrating the main process steps carried out on the calling party's side. The process beings at step 100, whereupon user A initiates an IMS session with user B. This session may be, for example, a Push-to-talk over Cellular (PoC) session or a multimedia call. At step 102, user A's terminal, UE A, generates an SDES session key KA, and includes this in an INVITE that is sent towards user B. At step 103, the P-CSCF of user A (P-CSCF A) intercepts the INVITE. P-CSCF A then determines at step 104 whether or not IMS AKA has been run with user A (that is since user A's last registration with the IMS network). If the answer is yes, and AKA keys CkA and IkA exist, these keys are identified by the P-CSCF A at step 105 and are used at step 106, together with the session key KA, to generate a new media key K. If it is determined at step 104 that no IMS AKA has been run, then a new media key is generated at step 107 using the session key KA. At step 108 the new media key is sent by the P-CSCF to the responsible media handler. The P-CSCF then sends the INVITE on towards its destination at step 109, and the session setup continues, step 110. It will be appreciated that the order in which the steps are carried out may differ somewhat from the illustrated order.

Figure 4:
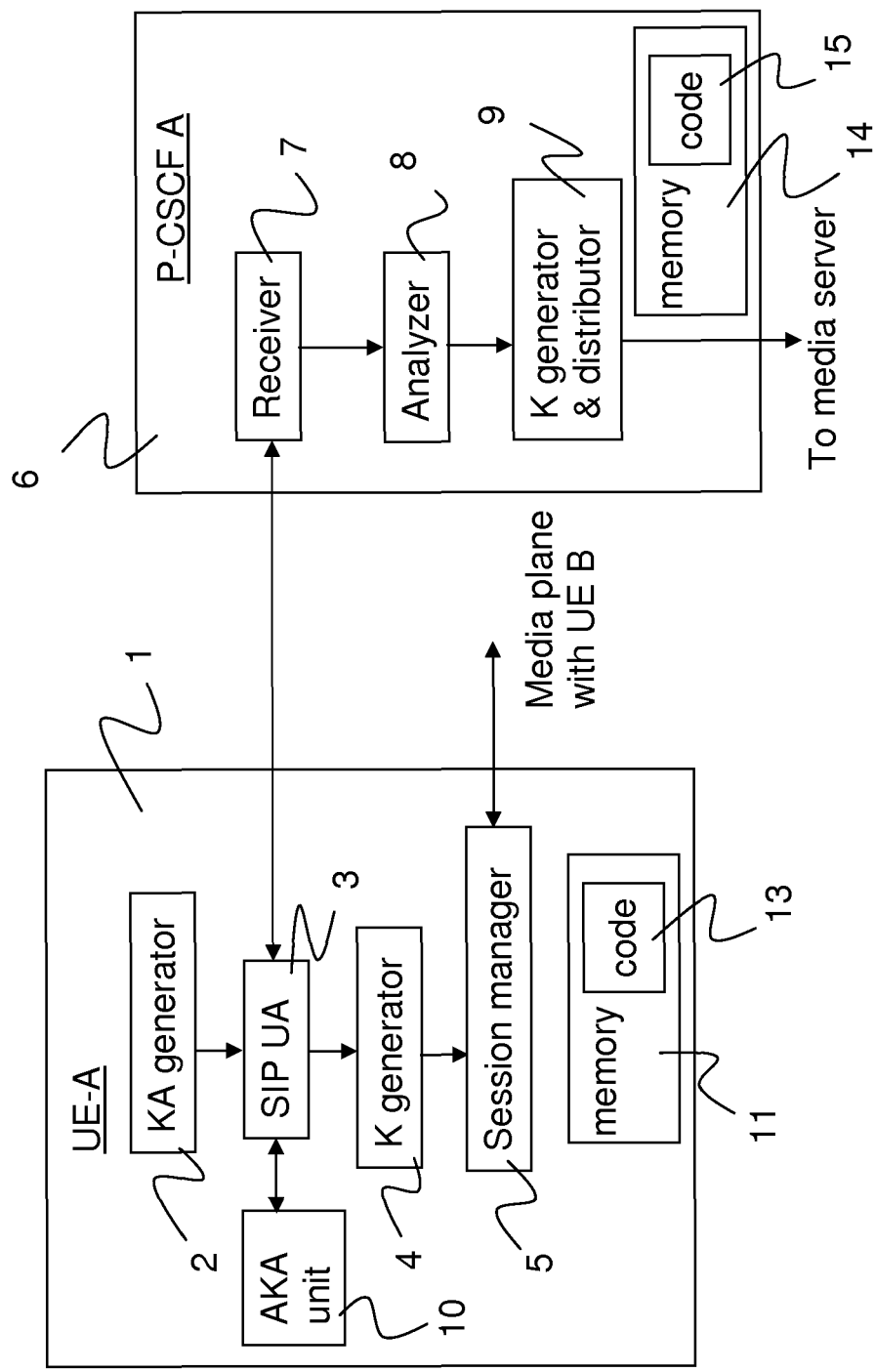
FIG. 4 illustrates schematically a user terminal and a P-CSCF node configured to employ the approach of FIGS. 2 and 3.

FIG. 4 illustrates schematically components of a UE (in this case UE A) and a P-CSCF (in this case P-CSCF A). The UE 1 comprises a key (KA) generator 2 implementing the key generation function for the SDES protocol. This key (a random or pseudo-random number) is provided to a SIP user agent (UA) 3 which controls IMS session establishment. The UE also comprises a media key (K) generator 4 which is able to generate a media key depending upon whether the UE has previously been authenticated to the IMS network using IMS AKA and involving a signalling plane authentication unit 10, in this case an AKA unit. The key is passed to a session manager 5 for use in securing the media plane. The UE may also comprise a digital memory or carrier 11 storing a control program 13. This control program interacts with the hardware to perform the required functions. Of course, any appropriate combination of hardware and software may be employed to implement the security processes within the UE.

The P-CSCF 6 comprises a receiver 7 for intercepting the SIP INVITE sent out by the UE 1. The receiver passes the INVITE to an analyzer 8 which identifies User A and determines whether or not IMS AKA has been run for the user. Depending upon the result, a key generator and distributor 9 first generates the media key K, and then passes this to an appropriate media handler (not shown). The UE may also comprise a digital memory or carrier 14 storing a control program 15. This control program interacts with the hardware to perform the required functions. Of course, any appropriate combination of hardware and software may be employed to implement the security processes within the P-CSCF.

It is of course possible that a terminal/network will support IMS AKA but not SDES. In this case, the P-CSCF and the UE would derive a key (from Ck, Ik only) and push it to the edge node.

It will be appreciated that if, for example, UE B and/or user B's network does not support SDES or IMS AKA, security will be provided but only between A and EA.

IMS AKA is only one example of a secure authentication and key generation scheme that may be detected and re-used. The only requirement on the mechanism used is that it produces a key (corresponding to (Ck, Ik)) shared between an end-user and the P-CSCF. Alternatives to IMS AKA include, for example, a Public Key Infrastructure (PKI) mechanism (e.g. TLS, RFC5246) or a password authenticated Diffie-Hellman mechanism (e.g. SPEKE, ISO/IEC 11770-4).

Alternatives to SDES as the fallback security mechanism may also be considered. For example, tickets according to a Keberos-like approach (RFC4120) may be employed, but instead of encrypting the tickets these are sent unprotected. Use of tickets is, as such, also discussed as an option in the aforementioned TR 33.828.

In the approach described with reference to FIG. 2, the SDES key is created by UE B and returned to user B's P-CSCF in step 5. An alternative is that the key on the terminating side is communicated in the other direction. That is, the SDES key on the UE B side is chosen by user B's P-CSCF and included when the SIP INVITE is sent to UE B in step 4. Security on the terminating leg is therefore initiated on the network side, rather than on the terminal side. If the P-CSCF of user A retained the SDES key KA when forwarding the INVITE to user B's network in step 3, the P-CSCF of user B may simply forward the same key to UE B. However, this would result in KA=KB which may not always be desirable from a security point of view.

Figure 5:
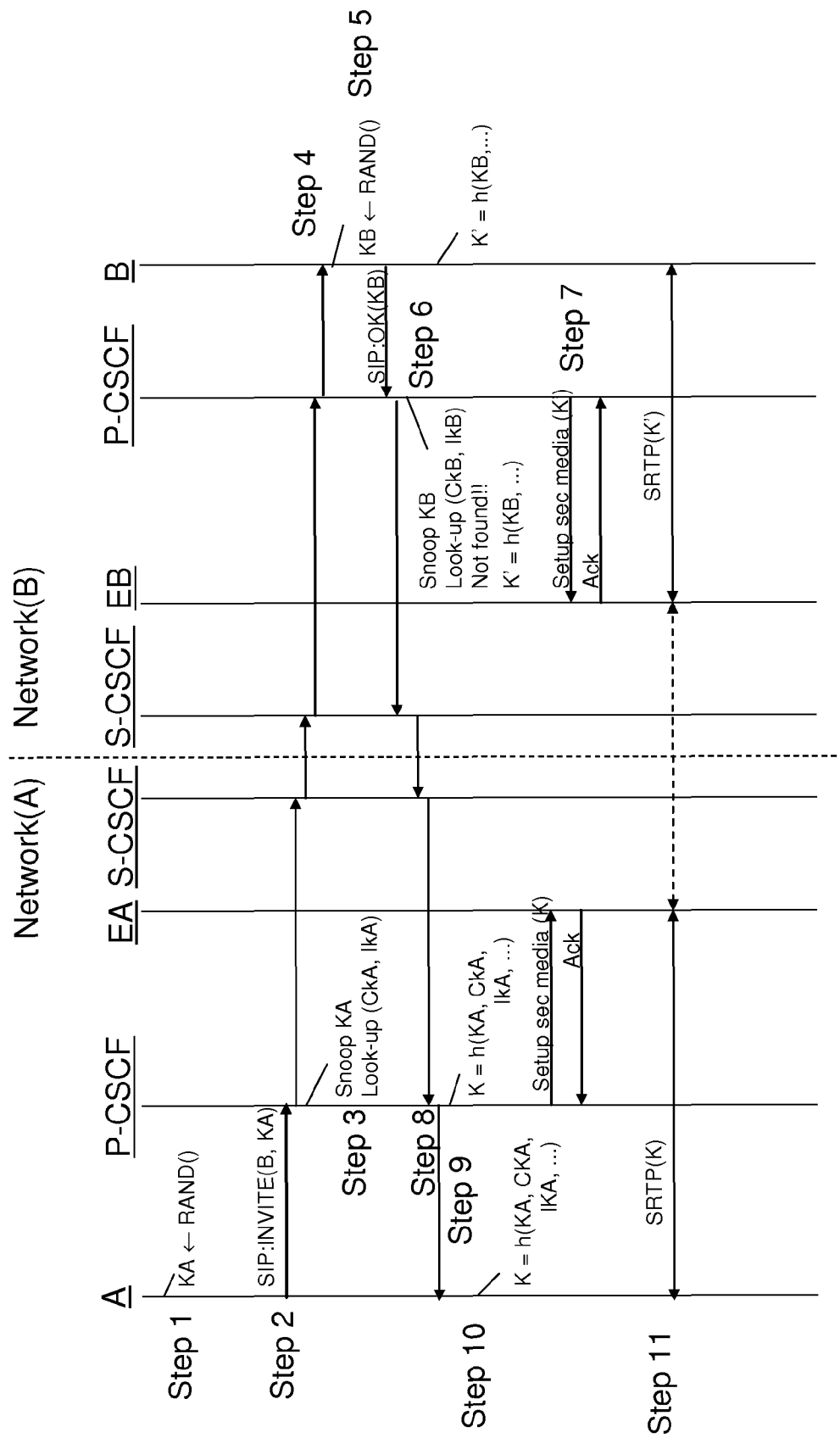
FIG. 5 illustrates signalling associated with an alternative e2ae approach to securing the media plane.

Typically, the entities EA/EB may not lie in the SIP signalling path. A signalling flow applicable to this network architecture is shown in FIG. 5. The protocol employed between the P-CSCFs and EA/EB may be SIP, H.248 or some other suitable protocol.

As will be understood from the above discussion, a UE and the associated P-CSCF should know implicitly whether or not the keys KA and KB have been previously established during the IMS AKA authentication. Nonetheless, the risk of incorrect key derivation may be reduced by adding an information element to the SIP signalling, explicitly stating whether (or not) IMS AKA has been used. For example, the UE A could include in the SIP INVITE a "reference" to the authentication, e.g. by including the RAND value used for IMS AKA (which would be similar to the use of the B-TID in the Generic Bootstrapping Architecture (GBA)). Absence of this indication may then also be used by the P-CSCF to conclude that the UE lacks a (valid) key and this may for instance trigger a new IMS AKA procedure before the call is set up. Similarly, as another option, the P-CSCF may in a reply (e.g. in conjunction with the SIP TRYING or 200 OK messages) include a hint, confirming to the UE that the P-CSCF was able to find the correct shared key, thereby increasing the robustness of the approach.

It will be appreciated by the person of skill in the art that various modifications may be made to the above described embodiments without departing from the scope of the present invention. For example, whilst the embodiments described above have been concerned with a 3GPP IMS setting, the invention is also applicable in non-3GPP settings. It is only required that a media session set-up signalling protocol (e.g. SIP) is used between the end-users and some signalling server with which the users may establish shared keys, e.g. as result of user authentication/registration. Furthermore, any suitable data security mechanism may be used to secure data in the media plane using the derived media keys. For services based on TCP/UDP, PSK-TLS/TLS may be employed, see IETF RFCs 5246 and 4347. Alternatively, media may be protected on the IP layer, using for example IPSec.

According to another modification to the embodiments described above, it is possible to perform the network key generation step at a signalling plane node other then the P-CSCF. For example, a suitable alternative might be an S-CSCF.

The invention claimed is:

1. A method of establishing keys for at least partially securing media plane data exchanged between first and second end points via respective first and second media plane network nodes, the method comprising:
sending session set-up signalling from said first end point towards said second end point, said session set-up signalling including a session key generated by said first end point;
intercepting said set-up signalling at a first signalling plane network node and determining whether a signalling plane key has already been established for securing the signalling plane between said first end point and said first signalling plane network node;
if the signalling plane key has already been established, then deriving from the signalling plane key a media plane key, and sending the media plane key to said first media plane network node for securing the media plane between said first end point and said first media plane network node; and
if the signalling plane key has not already been established, then deriving from said session key an alternative media plane key, and sending the alternative media plane key to said first media plane network node for securing the media plane between said first end point and said first media plane network node.

2. The method according to claim 1, wherein said set-up signalling comprises a Session Initiation Protocol (SIP) INVITE message.

3. The method according to claim 1, wherein said first signalling plane network node comprises a node within an Internet Protocol (IP) Multimedia Subsystem network.

4. The method according to claim 3, wherein said signalling plane network node comprises a Proxy Call State Control Function.

5. The method according to claim 3, wherein determining whether the signalling plane key has already been established for securing the signalling plane between said first end point and said first signalling plane network node comprises determining whether an IP Multimedia Subsystem network AKA procedure has been run between said first end point and the IP Multimedia Subsystem network.

6. The method according to claim 1, wherein said session set-up signalling comprises an explicit indication of whether the signalling plane key has already been established.

7. The method according to claim 1, wherein, if the signalling plane key has already been established, deriving the media key further comprises deriving the media key using both said signalling plane key and said session key.

8. The method according to claim 1, wherein said session key is generated and transferred by said first end point in accordance with the Session Description Protocol Security Descriptions for Media Streams protocol.

9. The method according to claim 1 further comprising:
intercepting session set-up signalling at a second signalling plane network node and determining whether a second signalling plane key has already been established for securing the signalling plane between said second end point and said second signalling plane network node; and
if the second signalling plane key has already been established, then deriving from the second signalling plane key a second media plane key, and sending the second media plane key to said second media plane network node for securing the media plane between said second end point and said second media plane network node.

10. The method according to claim 9, wherein said second signalling plane network node comprises a node within an Internet Protocol (IP) Multimedia Subsystem network.

11. The method according to claim 10, wherein determining whether the second signalling plane key has already been established for securing the signalling plane between said second end point and said second signalling plane network node comprises determining whether an IP Multimedia Subsystem network AKA procedure has been run between said second end point and the IP Multimedia Subsystem network.

12. The method according to claim 11, wherein said session set-up signalling intercepted at said second signalling plane network node includes a second session key generated by said second end point, the method further comprising, in the event that the second signalling plane key has not already been established, deriving from said second session key a second alternative media plane key, and sending the second alternative media plane key to said second media plane network node for securing the media plane between said second end point and said second media plane network node.

13. The method according to claim 11, wherein said session set-up signalling intercepted at said second signalling plane network node includes said session key generated by said first end point, the method further comprising, in the event that the second signalling plane key has not already been established, deriving from said second session key a second alternative media plane key, and sending the second alternative media plane key to said second media plane network node for securing the media plane between said second end point and said second media plane network node.

14. A user terminal for conducting a media session with a peer terminal, said user terminal comprising:
   a session key generation circuit configured to generate a session key;
   a session initiation circuit configured to send session set-up signalling towards said peer user terminal, via a first signalling plane network node, the session initiation circuit including said session key in said signalling;
   a media key generation circuit configured to determine whether a signalling plane key has already been established for securing the signalling plane between the user terminal and said first signalling plane network node, and, if the signalling plane key has already been established, for then deriving from said signalling plane key a first media plane key, and, if the signalling plane key has not already been established, for then deriving from said session key a second media plane key; and
   a session manager circuit configured to use the first or second media plane key to secure the media plane between the user terminal and said first media plane network node.

15. The user terminal according to claim 14, wherein said session initiation circuit comprises an Internet Protocol (IP) Multimedia Subsystem client.

16. The user terminal according to claim 15, wherein said media key generation circuit determines whether the signalling plane key has already been established by determining whether an IP Multimedia Subsystem AKA procedure has been run between the user terminal and an IP Multimedia Subsystem network.

17. The user terminal according to claim 14, wherein said session key generation circuit and said session initiation circuit are configured according to the Session Description Protocol Security Descriptions for Media Streams protocol.

18. A signalling plane network node comprising:
   a receiver circuit configured to intercept session set-up signalling including a session key, said set-up signalling sent from a first end point towards a second end point;
   an analyzer circuit configured to determine whether a signalling plane key has already been established for securing the signalling plane between said first end point and the signalling plane network node; and
   a media plane key generation circuit and distributor configured, in the event that the signalling plane key has already been established, to derive from the signalling plane key a media plane key, and, in the event that the signalling plane key has not already been established, to derive from the session key an alternative media plane key, and to send the media plane key or the alternative media plane key to said first media plane network node for securing the media plane between said first end point and said first media plane network node.

19. The signalling plane network node according to claim 18, wherein the signalling plane network node comprises an Internet Protocol (IP) Multimedia Subsystem network server.

20. The signalling plane network node according to claim 19, wherein the signalling plane network node comprises a Proxy Call State Control Function.

21. A computer program stored on a non-transitory computer readable medium for controlling a user terminal, the computer program comprising computer program instructions which, when run on the user terminal, cause the user terminal to:
   generate a session key;
   send session set-up signalling towards a peer terminal, via a first signalling plane network node, and including in said set-up signalling said session key;
   determine whether a signalling plane key has already been established for securing the signalling plane between the user terminal and said first signalling plane network node, and, if the signalling plane key has already been established, for then deriving from the signalling plane key a first media plane key, and, if the signalling plane key has not already been established, for then deriving from said session key a second media plane key; and
   use the first or second media plane key to secure the media plane between the user terminal and said first media plane network node.

22. A computer program stored on a non-transitory computer readable medium for controlling a network node, the computer program comprising computer program instructions which, when run on the network node, cause the network node to:
   intercept session set-up signalling sent from a first end point towards a second end point, said set-up signalling including a session key;
   determine whether a signalling plane key has already been established for securing the signalling plane between said first end point and the signalling plane network node;
   in the event that the signalling plane key has already been established, to derive from that key a media plane key, and, in the event that the signalling plane key has not already been established, to derive from the session key an alternative media plane key; and
   sending the media plane key or the alternative media plane key to said first media plane network node for securing the media plane between said first end point and said first media plane network node.

* * * * *